United States Patent
Lees et al.

[19]

[11] Patent Number: 6,062,002
[45] Date of Patent: May 16, 2000

[54] ADJUSTABLE ULTRASONIC TOP SEALER

[75] Inventors: John Lees, Minneapolis; Terry Erickson, St. Paul, both of Minn.

[73] Assignee: Tetra Laval Holdings & Finance, SA, Pully, Switzerland

[21] Appl. No.: 09/199,509

[22] Filed: Nov. 25, 1998

[51] Int. Cl.[7] .............................. B65B 51/22; B65B 51/32
[52] U.S. Cl. ..................... 53/565; 53/372.3; 53/DIG. 2; 53/371.8; 493/475
[58] Field of Search ............................... 53/371.8, 372.3, 53/DIG. 2, 565; 493/475, 478; 248/278.1, 279.1, 281.11, 287.1; 403/54; 269/45

[56] References Cited

U.S. PATENT DOCUMENTS

| | | | |
|---|---|---|---|
| 1,313,061 | 8/1919 | Brown | 269/45 |
| 3,589,248 | 6/1971 | Lense | 93/36 |
| 3,925,962 | 12/1975 | Knopf et al. | 53/527 |
| 4,133,518 | 1/1979 | Clapper | 248/287.1 |
| 4,159,220 | 6/1979 | Bosche | 43/374.8 |
| 4,193,833 | 3/1980 | Young | 53/DIG. 2 |
| 4,285,682 | 8/1981 | Moss | 493/316 |
| 5,058,360 | 10/1991 | Yamazaki | 53/DIG. 2 |
| 5,165,221 | 11/1992 | Udelson et al. | 53/550 |
| 5,347,795 | 9/1994 | Fukuda | 53/552 |
| 5,463,850 | 11/1995 | Fukuda | 53/551 |
| 5,605,026 | 2/1997 | Schott | 56/DIG. 2 |
| 5,635,020 | 6/1997 | Stahl | 156/580 |
| 5,809,741 | 9/1998 | Tovey | 53/289 |
| 5,809,743 | 9/1998 | Ylonen et al. | 53/370.6 |

*Primary Examiner*—John Sipos
*Attorney, Agent, or Firm*—Welsh & Katz, Ltd.

[57] ABSTRACT

The ultrasonic sealing device (50) may be integrated on a packaging machine (20) such as a TETRA REX® packaging machine and used for sealing one end of a carton (200). The ultrasonic sealing device (50) includes a frame (52), an anvil (56), a horn (54) and a plurality of adjustable shafts (60–65). The anvil (56) is disposed on one side of a carton pathway (32) and moveably attached to the frame (52). The ultrasonic horn (54) is disposed on another side of the carton pathway (32) opposite the anvil (56) and moveably attached to the frame (52). The plurality of adjustable shafts (60–65) includes a first plurality of adjustable shafts (60,61) connected to the frame (52), and allowing for vertical adjustment of the frame (52) relative to the carton pathway (32). It also includes a second plurality of adjustable shafts (62,63) connected to the frame (52) and allowing for transversal adjustment of the frame (52) relative to the carton pathway (32). Yet further, the plurality of adjustable shafts (60–65) includes a third plurality of adjustable shafts (64,65) connected to the frame (52) and allowing for horizontal adjustment of the frame (52) relative to the carton pathway (32). A cooling jaw assembly (100) is disposed subsequent to the ultrasonic sealing device (50) for cooling of a carton (200) after sealing of one end thereof.

10 Claims, 8 Drawing Sheets

ADJUSTABLE ULTRASONIC TOP SEALER

CROSS REFERENCES TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to ultrasonic sealers for packaging machines. Specifically, the present invention relates to an ultrasonic top sealer for a gable top carton packaging machine.

2. Description of the Related Art

Gabled containers made from paperboard material abound in many different environments. These containers are used commonly for both edible and non-edible products.

Typically, this type of container is erected from a pre-formed paperboard blank which is coated on both sides with polyethylene, or other known heat-sealable material. The blank has pre-formed fold lines which allow sequential folding of parts of the blank in a predetermined fashion to erect the container. In one preliminary folding stage, the container assumes a cup shape with an open end. A closure portion, which is made up of gable panels and a plurality of fins, is then reconfigured so that the panels converge upwardly to the fins which are brought into mutually overlying relationship. The closure portion of the container can be sealed using a number of different techniques, among which is an ultrasonic sealing technique. Ultrasonic sealing is carried out by sandwiching the fins between a sealing horn/sonotrode and anvil. Vibrational energy generated through the horn/sonotrode causes a fusion between the heat-sealable material on abutting fin surfaces. Exemplary ultrasonic sealing apparatus and methods are described in each of U.S. Pat. Nos. 5,564,255; 5,575,884; and 5,605,026, all of which have been assigned to Tetra Laval Holdings and Finance S.A.

For product that is required to be maintained in an aseptic environment, hermetic sealing between the fins is required. Conventional hot air sealing techniques may not be capable of effecting the required quality of hermetic seal for these products. Thus, ultrasonic sealing is conventionally used in most such operations. While conventional ultrasonic sealing techniques may be practiced to produce a high integrity hermetic seal, conventional ultrasonic sealing techniques introduce a time factor that must be contended with.

More particularly, the heat-sealable material must be cooled after fusion sufficiently that it will stably maintain the seal. The seal is put under stress by the restoring force in the gable panels and fins after the captive force between the sealing horn/sonotrode and anvil is eliminated. This problem can be minimized by allowing additional cooling time. However, doing so may not be compatible with the intended operating speeds of modern filling equipment. As an example, a line which is designed to operate at 14,000 packages per hour, allows only approximately 580 ms for each sealing step. The objectives of making a high integrity hermetic seal and producing the seal quickly on a filling line thus come into competition. By effecting the seal over substantially the entirety of the exposed fin surfaces, a more aggressive holding force can be established between the fins. However, the larger the area that is sealed, the greater is the heat retention within the seal and the longer becomes the cooling time for the seal to be stabilized.

One major problem with the use of ultrasonic sealing is the precise alignment of the sonotrode and anvil relative to each other and relative to the carton pathway. Due to the tremendous forces and vibrations involved in ultrasonic sealing, the unit is usually tightly restrained on the packaging machine which creates a problem when adjustments are necessary. These adjustments may arise when new carton sizes are used, or new material (thicker or thinner) are used, or during cleaning of the packaging machine. Further, the chain used in conveying cartons is stretched over its lifetime approximately five millimeters. This stretching of the chain requires adjustments to the ultrasonic sealing device to precisely align the anvil an sonotrode with the top fin of a carton.

BRIEF SUMMARY OF THE INVENTION

It is a primary object of the present invention to provide an adjustable ultrasonic sealing device.

It is an additional object of the present invention to provide an adjustable ultrasonic sealing device for sealing the top fin of a carton being processed on a packaging machine.

It is an additional object to provide an adjustable ultrasonic sealing device with a cooling assembly. One solution to the problems of the prior art is n ultrasonic sealing device for a packaging machine for forming, filling and sealing a series of cartons being conveyed along a carton pathway. The ultrasonic sealing device includes a frame, an anvil, a horn and a plurality of adjustable shafts. The frame is disposed above the carton pathway. The anvil is disposed on one side of the carton pathway and moveably attached to the frame. The ultrasonic horn is disposed on another side of the carton pathway opposite the anvil and moveably attached to the frame. The plurality of adjustable shafts includes a first plurality of adjustable shafts connected to the frame and allowing for vertical adjustment of the frame relative to the carton pathway. It also includes a second plurality of adjustable shafts connected to the frame and allowing for transversal adjustment of the frame relative to the carton pathway. Yet further, the plurality of adjustable shafts includes a third plurality of adjustable shafts connected to the frame and allowing for horizontal adjustment of the frame relative to the carton pathway.

Having briefly described this invention, the above and further objects, features and advantages thereof will be recognized by those skilled in the pertinent art from the following detailed description of the invention when taken in conjunction with the accompanying drawings.

DETAILED DESCRIPTION OF THE INVENTION

The present invention may be integrated on a typical linear packaging machine for gable top cartons such as a TETRA REX® packaging machine available from Tetra Pak Incorporated of Chicago, Ill. The present invention may also be used on other packaging machines and for other applications that require ultrasonic sealing. Those skilled in the art will recognize the breadth of the present invention to multiple ultrasonic sealing applications.

Figure 1:
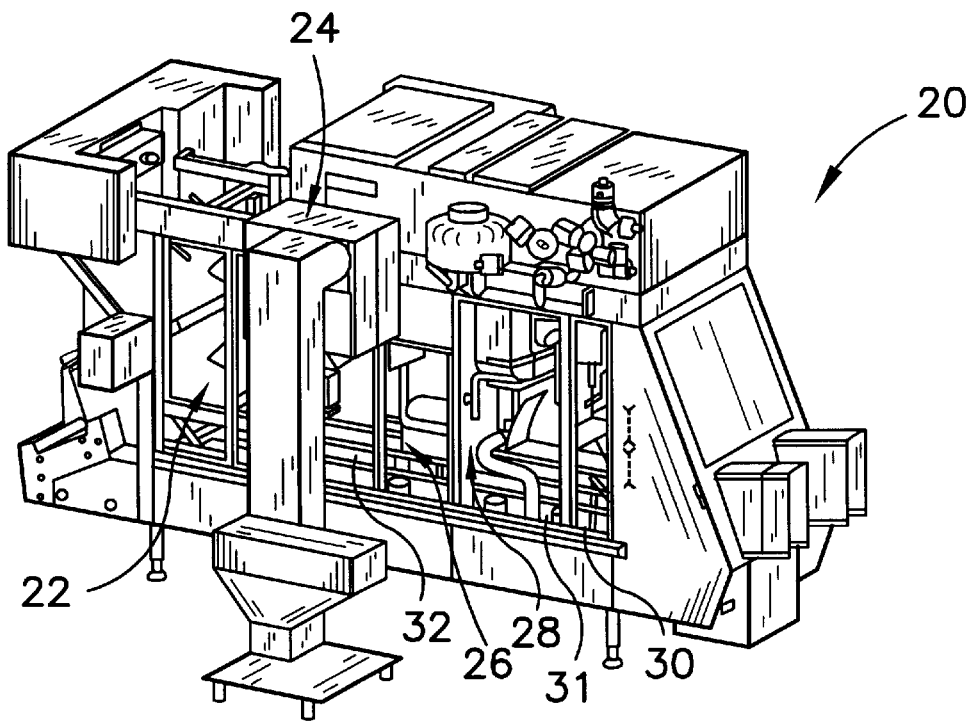
FIG. 1 is a top perspective view of a packaging machine of the present invention.
Figure 2:
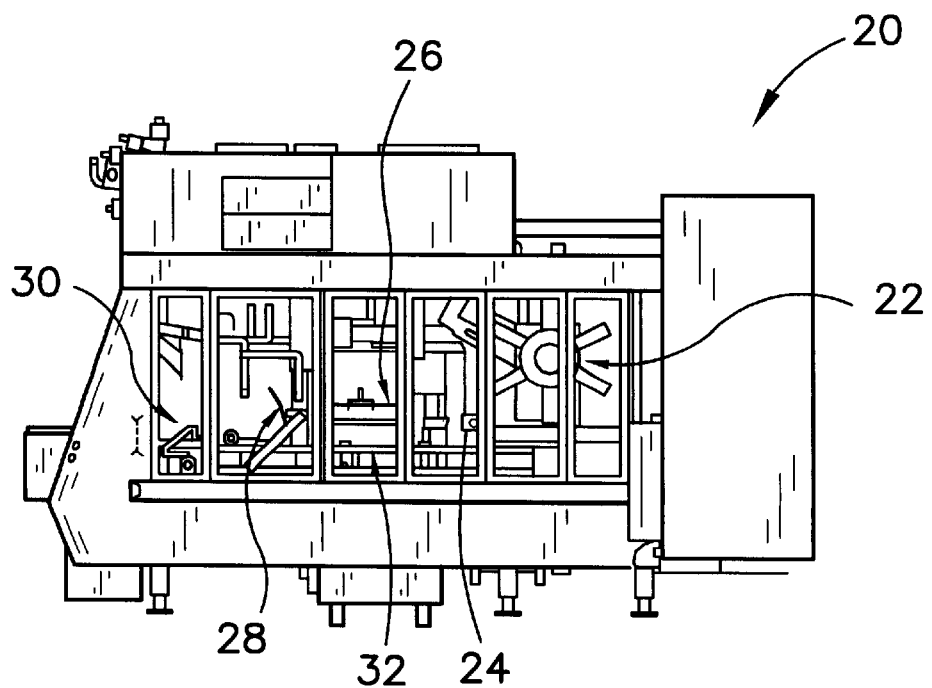
FIG. 2 is a side plan view of the packaging machine of FIG. 1.

As shown in FIGS. 1 and 2, a packaging machine designated 20 generally includes a bottom forming assembly 22, a fitment application station 24, a sterilization station 26, a filling station 28 and a top sealing station 30. All of the stations lie above a table top 31 which divides the operational aspects of the packaging machine 20 from the gearing and/or drive mechanisms. In operation, a series of carton blanks are fed from a magazine, not shown, erected and then placed onto the bottom forming assembly which includes a mandrel wheel with a multiple of mandrels projecting therefrom. Once the bottom is formed, each of the partially-formed cartons is discharged to a conveyor assembly 32 for line processing at the other stations. The conveyor assembly 32 is typically a pair of chains parallel to each other and forming individual pockets for placement of a carton therein, and defining a carton pathway. However, the conveyor assembly may be a single chain with guide pockets projecting therefrom as set forth in U.S. Pat. No. 5,799,779, which is hereby incorporated by reference. The cartons are then conveyed, at a predetermined indexed movement, to the other stations on the packaging machine 20. Many machines have dual lines disposed parallel to each other for greater production capacity. Additionally, some lines will be capable of multiple processing wherein more than one carton is processed on the same line at each station. For example, two cartons would be filled simultaneously at the filling station on the single line.

Once on the conveyor assembly 32, each carton is conveyed to a fitment application station 24 where a fitment is attached to the carton. Next, each carton is conveyed to a sterilization station 26 which may have a hydrogen peroxide sprayer and/or a ultraviolet light unit. It should be obvious to those skilled in the art that the fitment application station 24 and the sterilization station 26 are both optional.

Next, each carton is conveyed to a filling station 28 for introduction of a product into the carton. Typically, the product is milk or a fruit juice such as orange juice. However, other product such as soups or yogurt may also be introduced into the carton. Once the carton is filled with a product, the top panels of the carton are folded are set for top sealing at the top sealing station 30. Once mechanism for top folding is described in U.S. Pat. No. 5,809,743, entitled Top Folding And Sealing Apparatus For Forming And Sealing The Fin Of A Gabled Carton, which relevant parts are hereby incorporated by reference. In its primary application, the present invention is disposed at the top sealing station 30.

Figure 3:
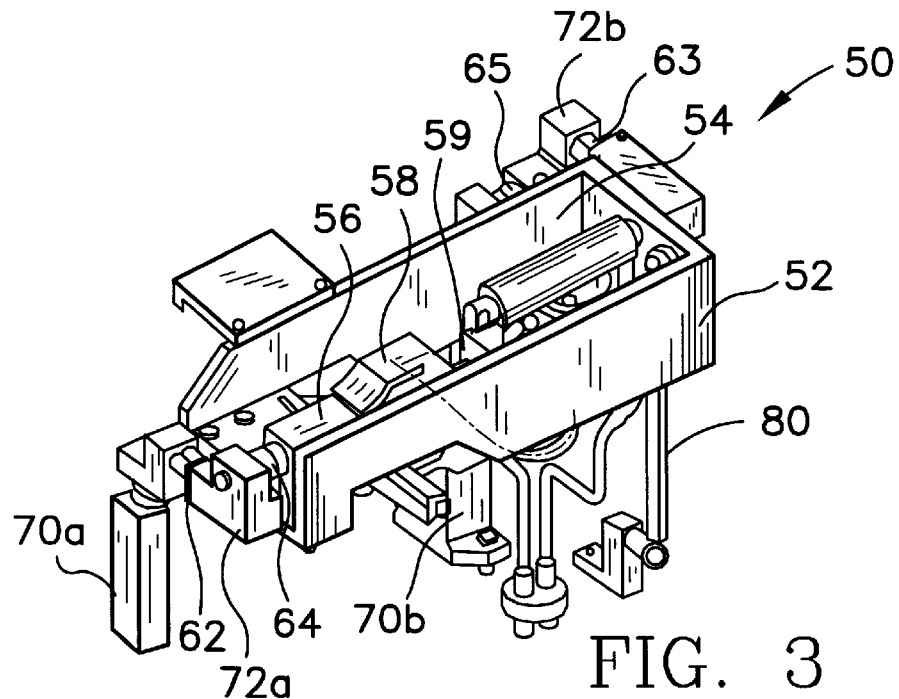
FIG. 3 is a top perspective view of the ultrasonic sealing device of the present invention.
Figure 4:
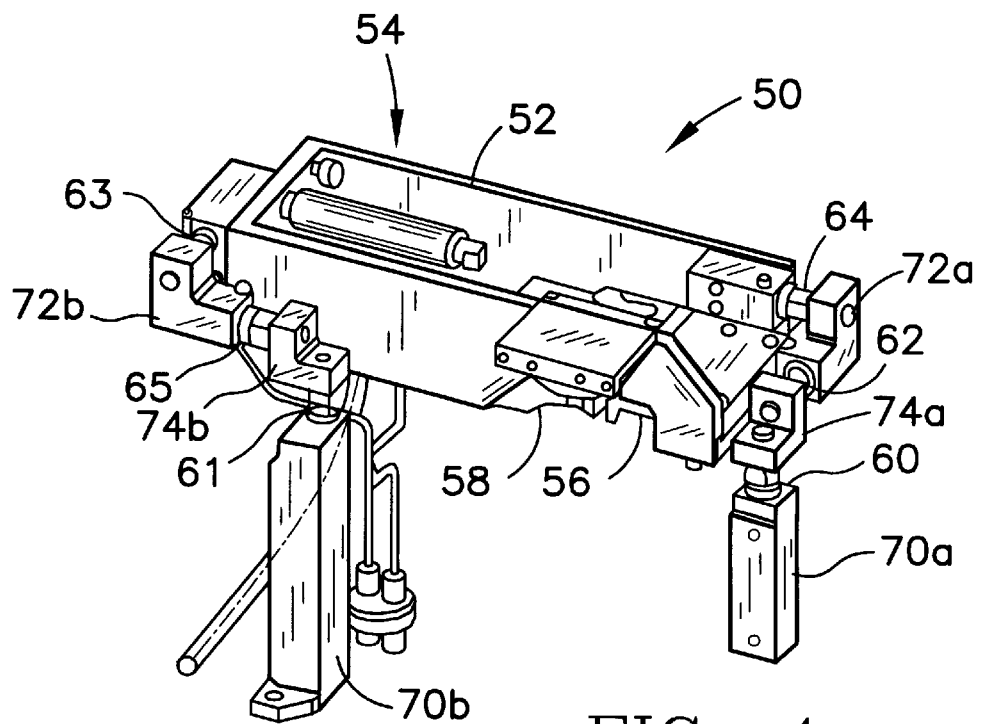
FIG. 4 is a top perspective opposite view of the ultrasonic sealing device of FIG. 3.
Figure 5:
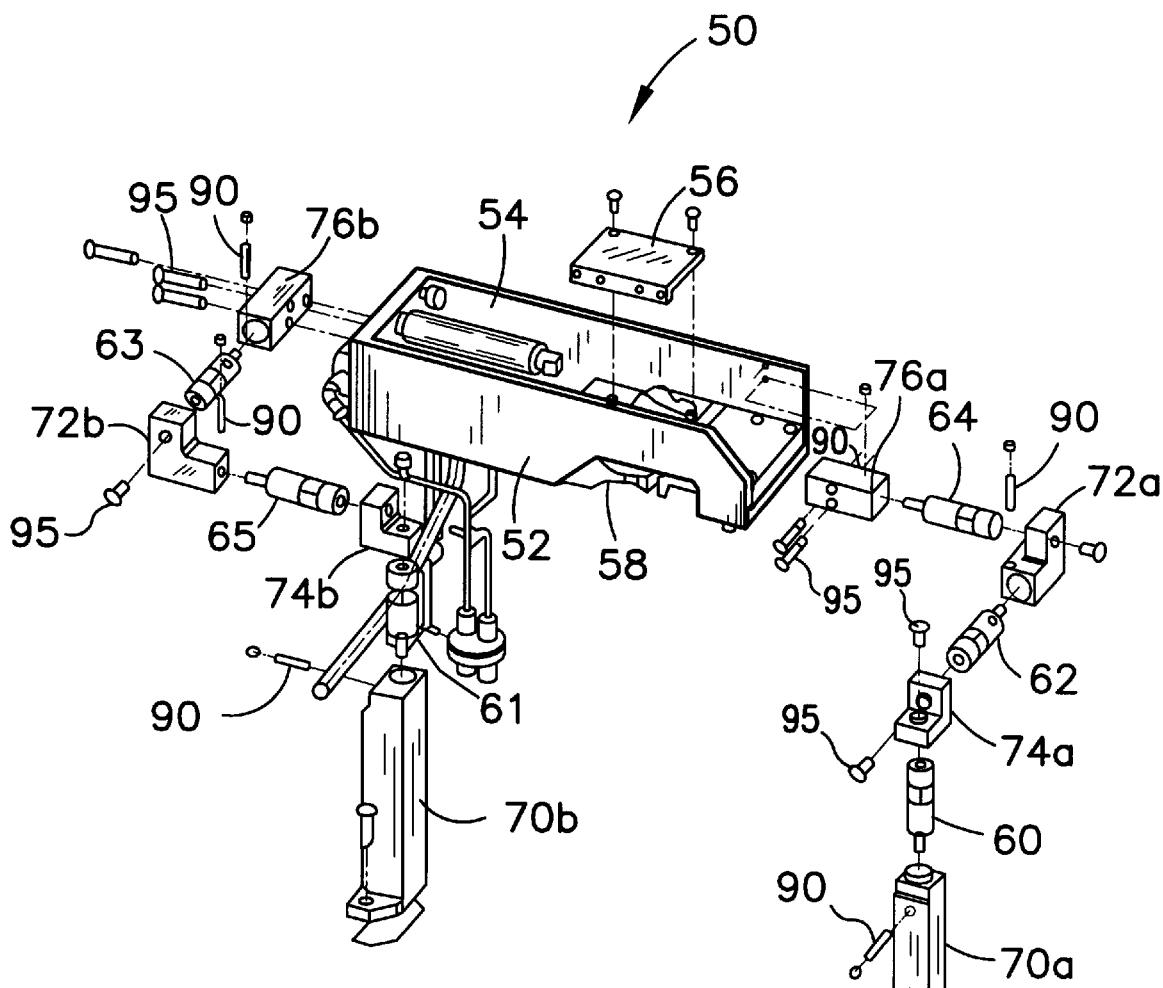
FIG. 5 is a top perspective exploded view of the ultrasonic sealing device of FIG.
Figure 6:
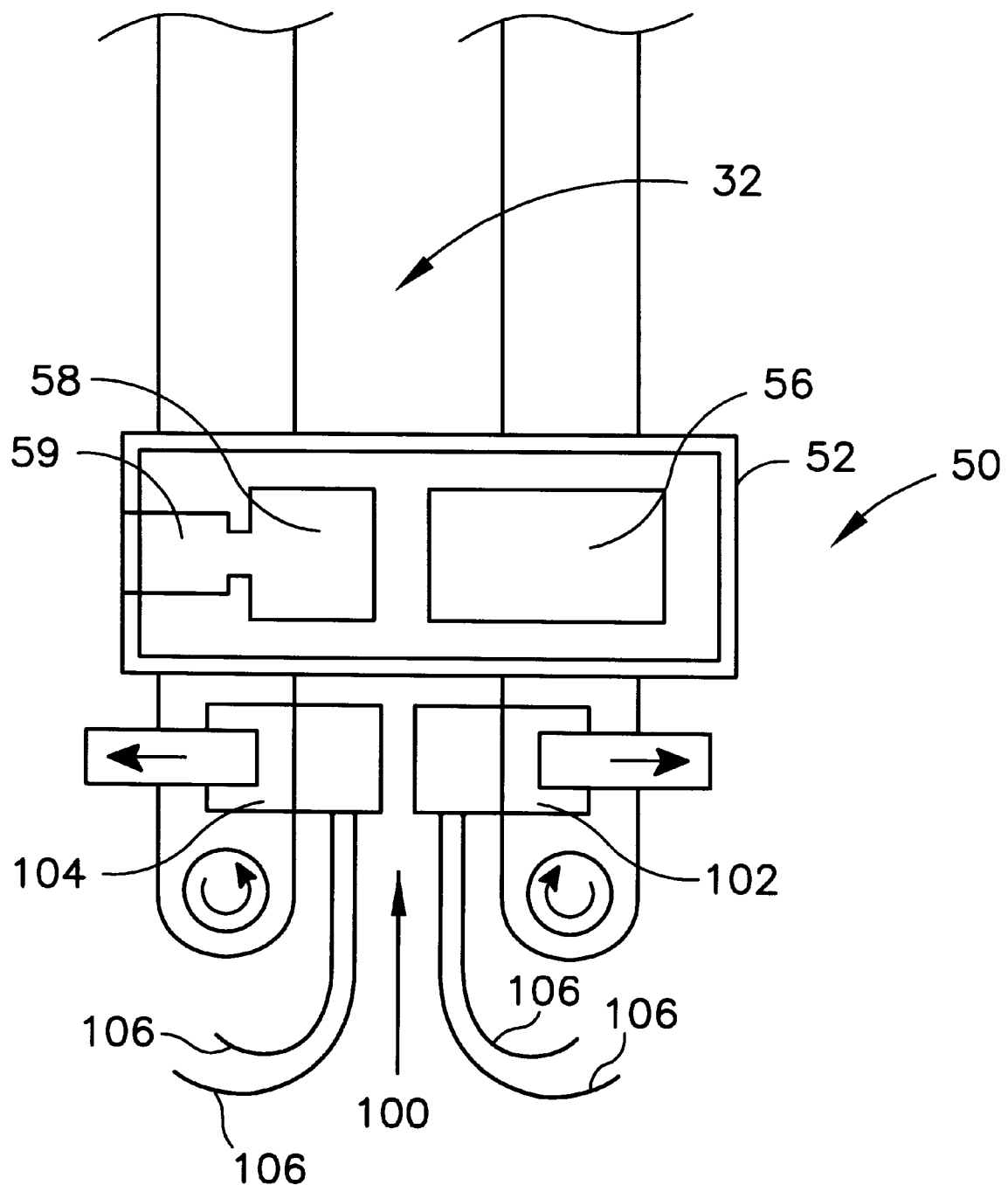
FIG. 6 is a top plan view of the ultrasonic sealing device and cooling assembly of the present invention.
Figure 6A:
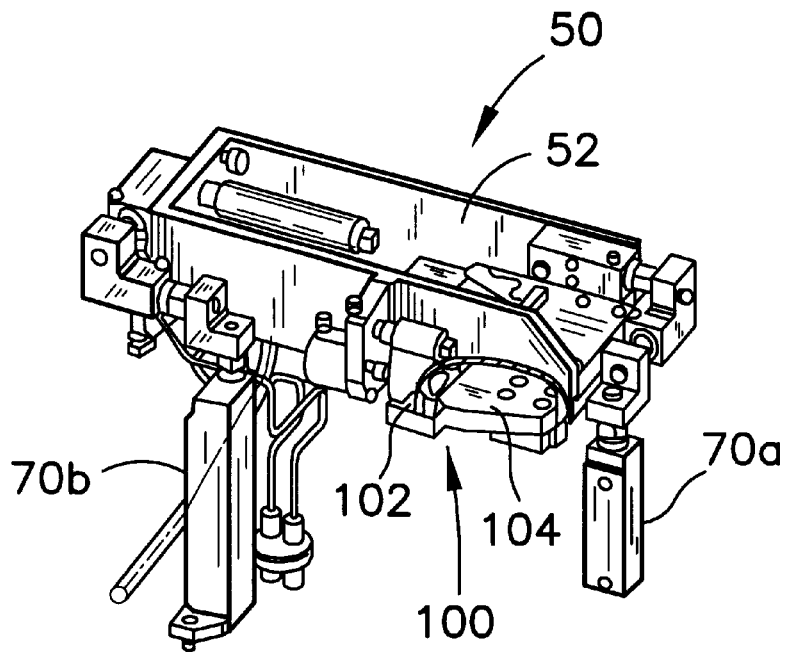
FIG. 6A is a top perspective view of an integrated ultrasonic sealing device and cooling assembly of the present invention.
Figure 6B:
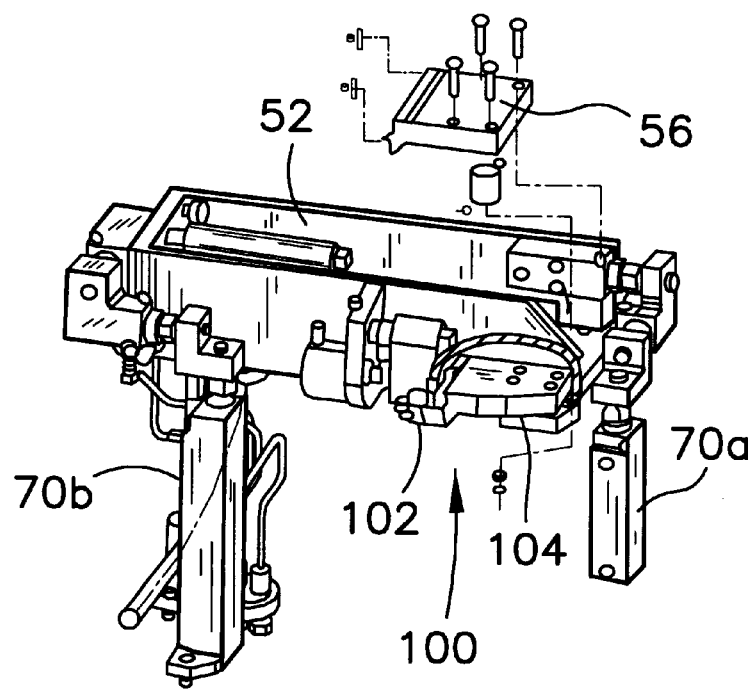
FIG. 6B is a partial exploded view of FIG. 6A.
Figure 6C:
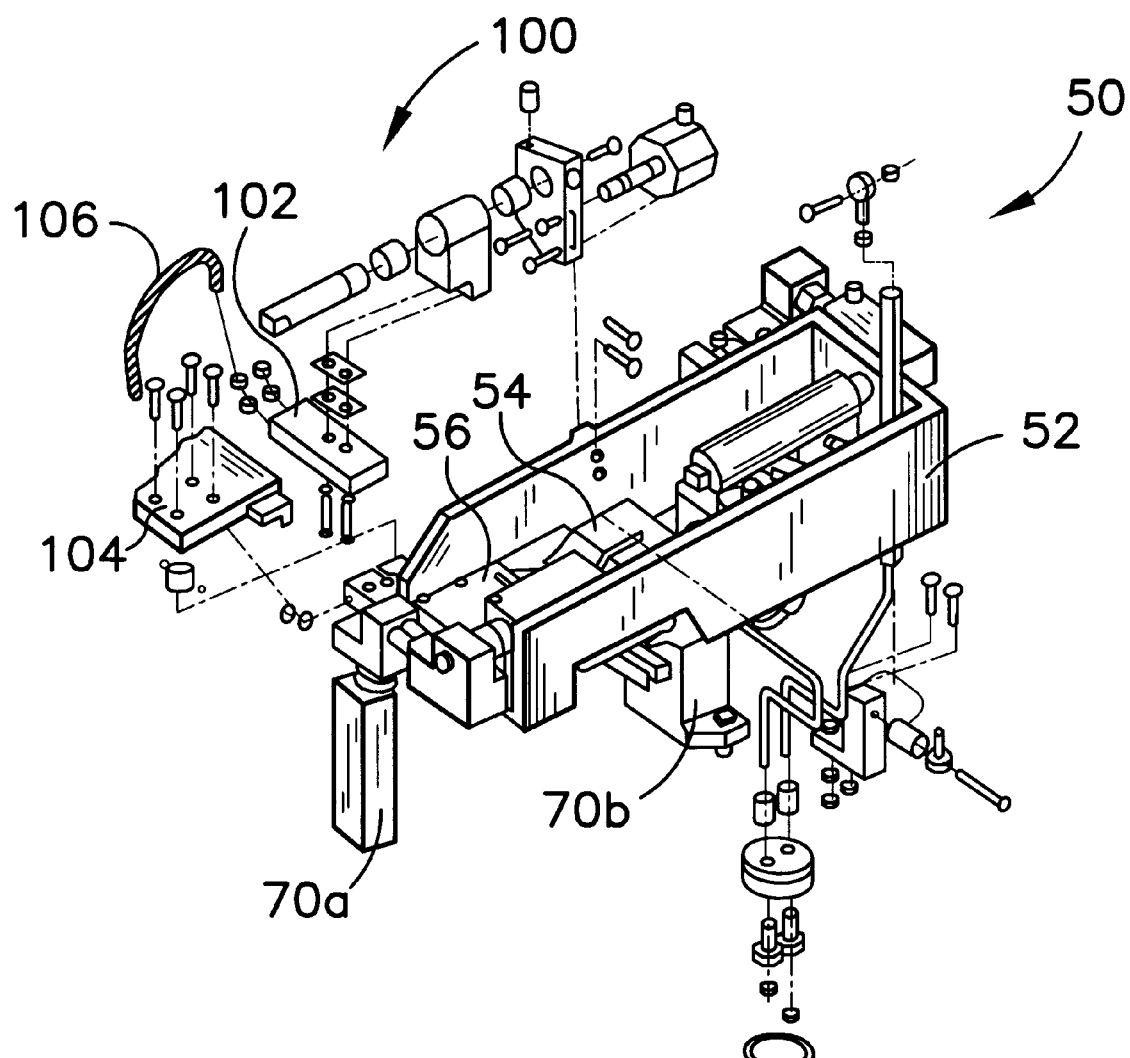
FIG. 6C is an exploded view of FIG. 6A.

As shown in FIGS. 3–5, the ultrasonic sealing device of the present invention is generally indicated as 50. The device 50 generally includes a frame 52, an ultrasonic horn complex 54 moveably attached to the frame 52, and an anvil 56 also moveably attached to the frame 52. The ultrasonic horn complex 54 includes a sonotrode 58 and a converter 59. The sonotrode 58 and the anvil 56 are positioned across from each other over the conveyor assembly 32, and are moved towards each to engage the top fin of the carton for ultrasonic sealing thereof. To create the proper seal, the sonotrode 58 and anvil 56 must be precisely aligned with the top fin of the carton. The anvil and ultrasonic horn complex may be moved by a number of mechanisms such as a servomotor or pneumatic cylinder.

The device 50 is positioned on the packaging machine 20 by various connections which allow for the frame 52 to have six degrees of freedom. That is, the frame 52 may move vertically, horizontally, transversally, rotate, pitch and yaw/roll, all relative to the carton pathway/conveyor assembly 32 and or the table top 31. More specifically, vertical movement would entail the frame 52 moving towards and away from the table top 31. Horizontal movement of the frame 52 would entail the frame moving along the conveyor assembly 32, toward or away from one end or the other of the packaging machine 20, in a similar movement of the cartons. Transversal movement of the frame 52 would entail movement across the conveyor assembly 32 toward and away from each side of the packaging machine 20.

To accomplish this, the ultrasonic device 50 has a plurality of vertical shafts 60 and 61, horizontal shafts 62 and 63, and transversal shafts 64 and 65. The vertical shafts 60 and 61 are respectively connected to columns 70a and 70b which are connected to the table top 31. The vertical shaft 60 is connected to the horizontal shaft 62 through an angle bracket 74a. The horizontal shaft 62 is then connected to the transversal shaft 64 through an adjusting bracket 72a. The transversal shaft 62 is connected to the frame 52 through a frame bracket 76a. The vertical shaft 61 is connected to the transversal shaft 65 through an angle bracket 74b. The transversal shaft 65 is connected to the horizontal shaft 63 through an adjusting bracket 72b. The horizontal shaft 63 is connected to the frame 52 through a frame bracket 76b.

Vertical, horizontal or transversal adjustment of the frame may take place by loosening/removing a corresponding set of iso-screws 95 and gudgeon pins 90 associated with a particular shaft. The shaft is then rotated will result in the desired movement. For most adjustments, both movement shafts will be moved equally. For example, if vertical alignment is necessary, both vertical shafts 60 and 61 are adjusted equally. However, there are some operations that require the movement of only one shaft such as with the initial placement of the device 50 on the packaging machine 20. It will be obvious to those skilled in the art that the frame 52 may undergo twisting movements as desired by appropriate adjustments of the shafts. In a preferred example, each of the adjusting shafts have a hexagonal wrench flats and a thread pitch of 1.5 millimeters resulting in a 0.25 millimeter movement of the sealing unit with a one-flat turn of a wrench. The frame 52 also has a support shaft 80. Adjustments may be made with the support shaft 80 locked in place. The support shaft 80 controls rotation about a diagonal line between the two sets of vertical, horizontal and transversal shafts. The support shaft 80 is necessary to make the frame 52 stable relative to the packaging machine 20.

Subsequent to the ultrasonic sealing device is a cooling jaw assembly 100. In a preferred embodiment, the cooling jaw assembly 100 is one indexed movement away from the device 50. The cooling jaw assembly is illustrated in FIGS. 6, 6A, 6B and 6C. The cooling jaw assembly 100 acts to further cool the top fin which has just received a predetermined amount of ultrasonic energy at the device 50. The cooling jaw assembly 100 acts to dissipate any excess heat from the top fin of the carton to provide a better seal. The cooling jaw assembly includes a first and second jaws 102 and 104 disposed across from each other above the conveyor assembly 32. The jaws 102 and 104 will have the same profile as the anvil 56 and sonotrode 58. The profile creates the configuration of the top fin of the carton as discussed in relation to FIGS. 8 and 9. The jaws will have inlet and outlet water lines 106 for maintaining a preset temperature for the jaws 102 and 104.

Figure 7:
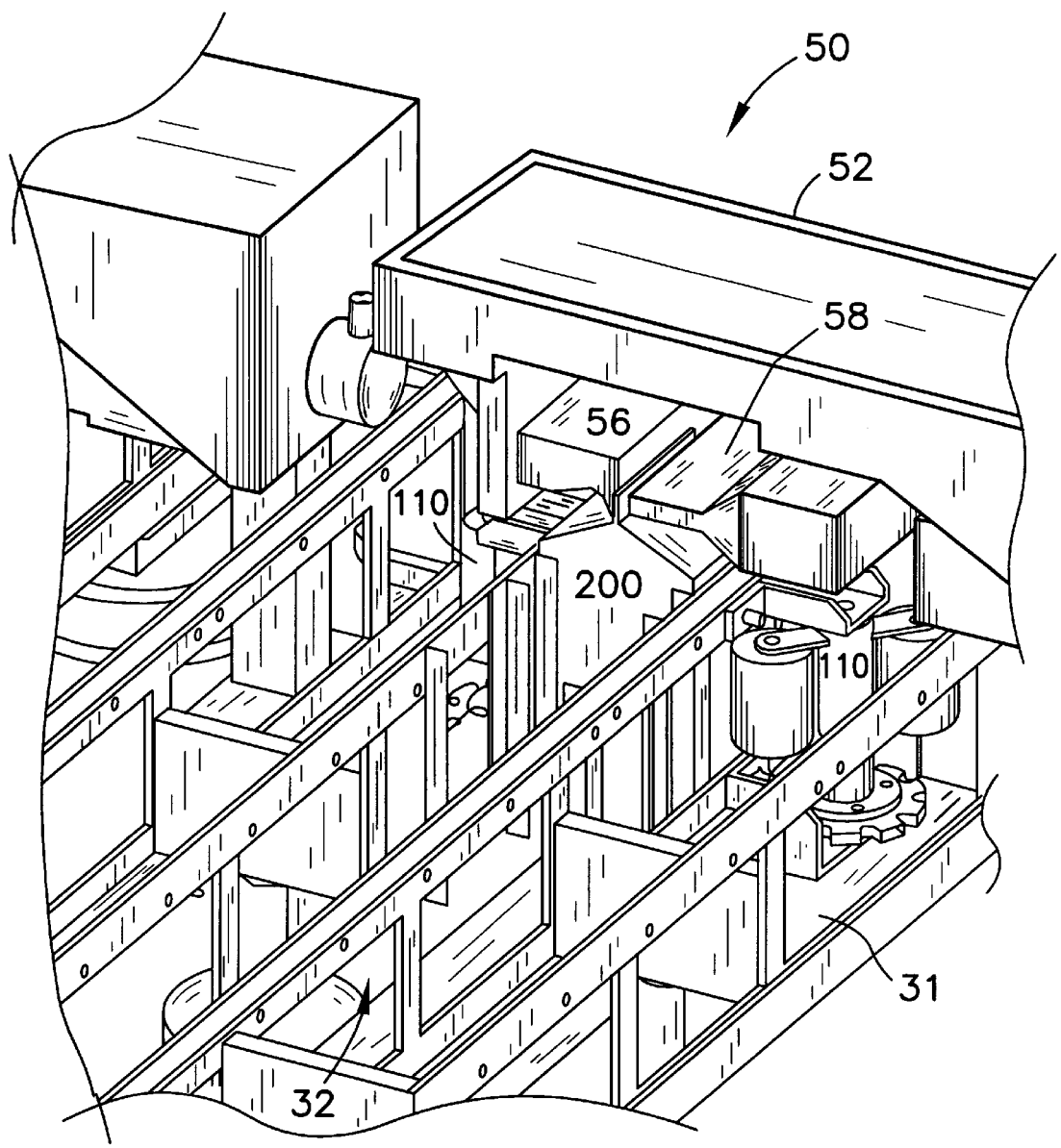
FIG. 7 is an isolated top perspective view a carton being sealed at the ultrasonic sealing device of the present invention.

FIG. 7 illustrates an isolated view of a carton entering the sealing device 50. Also shown are carton concaving devices 110 which are disclosed in U.S. Pat. No. 5,809,741, entitled Carton Concaving Device, which relevant parts are hereby incorporated by reference.

Figure 9:
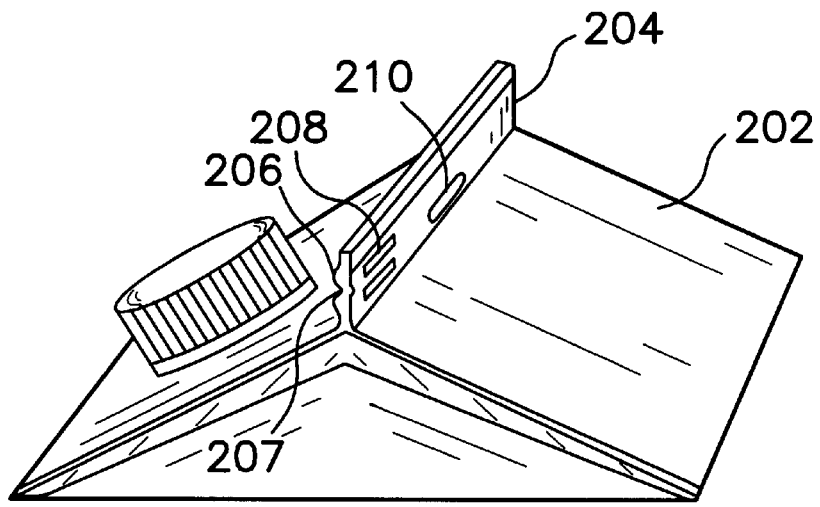
FIG. 9 is an isolate perspective view of the gable top of the carton of FIG. 9.
Figure 8:
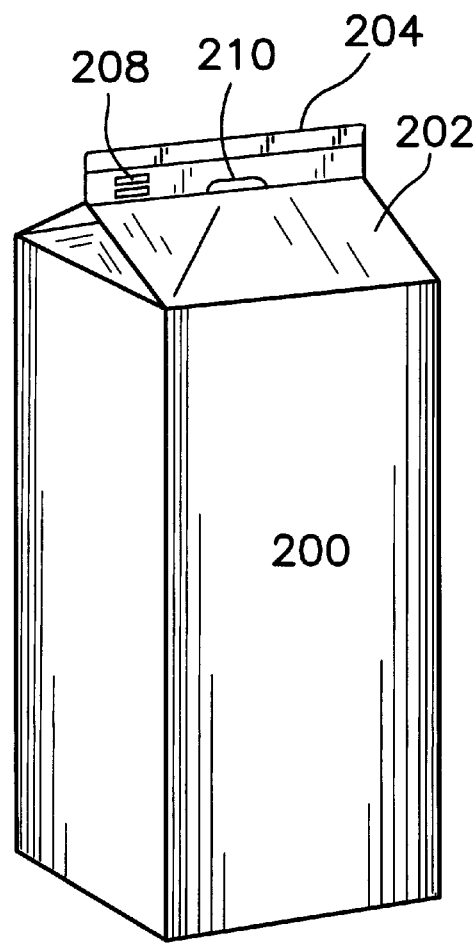
FIG. 8 is a perspective view of a carton sealed by the ultrasonic sealing device of the present invention.

FIGS. 8 and 9 shown a finished carton 200 that was sealed on the present invention. The gable top 202 of the carton 200 has a top fin 204 which is subject to the ultrasonic sealing performed by the device 50. The profiles of the anvils and sonotrode create the distinct configuration on the top fin 204 of the carton 200. This configuration consists of bulges 206 and depressions 207 on one side of the top fin 204, and compressions 208 and projections 210 on the other side of the top fin 204.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

We claim as our invention:

1. An ultrasonic sealing device for a packaging machine for forming, filling and sealing a series of cartons being conveyed along a carton pathway, the ultrasonic sealing device comprising:

a frame disposed above the carton pathway;

an anvil disposed on one side of the carton pathway and moveably attached to the frame;

an ultrasonic horn complex disposed on another side of the carton pathway opposite the anvil and moveably attached to the frame;

a first pair of vertically adjustable shafts connected to the frame for vertically adjusting the frame relative to the carton pathway;

a second pair of transversely adjustable shafts connected to the frame for transversely adjusting the frame relative to the carton pathway; and a third pair of horizontally adjustable shafts connected to the frame for horizontally adjusting the frame relative to the carton pathway.

2. The ultrasonic sealing device according to claim 1 wherein the ultrasonic horn complex comprises a sonotrode connected to a converter.

3. The ultrasonic sealing device according to claim 1 further comprising a plurality of columns for connecting the ultrasonic sealing device to the packaging machine.

4. The ultrasonic sealing device according to claim 1 further comprising a support shaft connected to the frame and to the packaging machine.

5. A packaging machine for forming, filling and scaling a series of cartons being conveyed along a carton pathway, the packaging machine comprising:

a table top extending along the length of the packaging machine;

a conveyor assembly defining the carton pathway, the conveyor assembly disposed on the table top;

a filling station disposed above the table top;

an ultrasonic sealing device disposed subsequent to the filling station, the ultrasonic sealing device comprising
a frame disposed above the carton pathway,
an anvil disposed on one side of the carton pathway and moveably attached to the frame,
an ultrasonic horn complex disposed on another side of the carton pathway opposite the anvil and moveably attached to the frame, and
a plurality of pairs of adjustable shafts connected to the frame for vertically, horizontally and transversely adjusting the frame relative to the table top.

6. The packaging machine according to claim 5 further comprising a cooling jaw assembly.

7. The packaging machine according to claim 5 wherein the ultrasonic horn complex comprises a sonotrode connected to a converter.

8. The packaging machine according to claim 5 wherein the plurality of adjustable shafts comprises:

a first pair of adjustable shafts connected to the frame and allowing for vertical adjustment of the frame relative to the carton pathway;

a second pair of adjustable shafts connected to the frame and allowing for transversal adjustment of the frame relative to the carton pathway; and a third pair of adjustable shafts connected to the frame and allowing for horizontal adjustment of the frame relative to the carton pathway.

9. The packaging machine according to claim 5 wherein the ultrasonic sealing device further comprises a support shaft connected to the frame and to the packaging machine.

10. The packaging machine according to claim 6 wherein the cooling jaw assembly has water flowing therethrough for cooling.

* * * * *